United States Patent [19]

Chow

[11] 4,335,852
[45] Jun. 22, 1982

[54] DEVICE FOR CONTROLLING THE FLOW OF FLUID

[75] Inventor: Ho Chow, River Edge, N.J.

[73] Assignee: Beatrice Foods Co., Moonachie, N.J.

[21] Appl. No.: 145,798

[22] Filed: May 1, 1980

[51] Int. Cl.³ ............................................. A01G 27/00
[52] U.S. Cl. ................................. 239/68; 137/624.12; 239/570
[58] Field of Search ..................... 239/67, 68, 70, 569, 239/570, DIG. 15; 137/624.11, 624.12

[56] References Cited

U.S. PATENT DOCUMENTS

| | | | |
|---|---|---|---|
| 603,984 | 5/1898 | Boening | 137/624.11 |
| 1,085,012 | 1/1914 | Bopp | 137/624.11 |
| 1,523,608 | 1/1925 | Roach . | |
| 1,523,609 | 1/1925 | Roach . | |
| 1,745,536 | 2/1930 | Gresham . | |
| 1,753,240 | 4/1930 | Howell et al. . | |
| 1,790,924 | 2/1931 | Johnson | 239/70 |
| 1,812,586 | 6/1931 | Elder . | |
| 2,209,961 | 8/1940 | De Lacy-Mulhall | 239/67 |
| 2,781,050 | 2/1957 | Edwards | 137/119 |
| 2,788,241 | 4/1957 | Jepson . | |
| 3,063,297 | 11/1962 | Hyde | 137/624.11 |
| 3,377,027 | 4/1968 | Mattson et al. | 239/189 |
| 3,891,148 | 6/1975 | Rousseau | 239/68 |
| 3,964,685 | 6/1976 | Chauvigne | 239/66 |
| 3,972,344 | 8/1976 | Chauvigne | 137/119 |
| 4,022,239 | 5/1977 | Schwindt et al. | 137/119 |

FOREIGN PATENT DOCUMENTS

| | | | |
|---|---|---|---|
| 57743 | 10/1974 | Australia | 239/67 |
| 323967 | 1/1935 | Italy | 137/624.12 |
| 250523 | 7/1926 | United Kingdom | 239/67 |

Primary Examiner—Robert B. Reeves
Assistant Examiner—Michael J. Forman
Attorney, Agent, or Firm—James & Franklin

[57] ABSTRACT

A device to control the flow of fluid uses a cam and ratchet wheel. A valve is operated by the cam portion of the wheel, which bears against the valve stem causing it to open. Fluid flow causes a pawl to drive the ratchet portion of the wheel, rotating the wheel until the valve stem bears against a low point in the cam, permitting the valve to close. A part of the ratchet portion does not contain ratchet teeth, in which area the pawl cannot drive the wheel. In this area, the cam has an increasing radius from a radius corresponding to a closed valve, to a radius corresponding to a fully open valve. This permits manual control of fluid flow without disengagement of the device.

17 Claims, 12 Drawing Figures

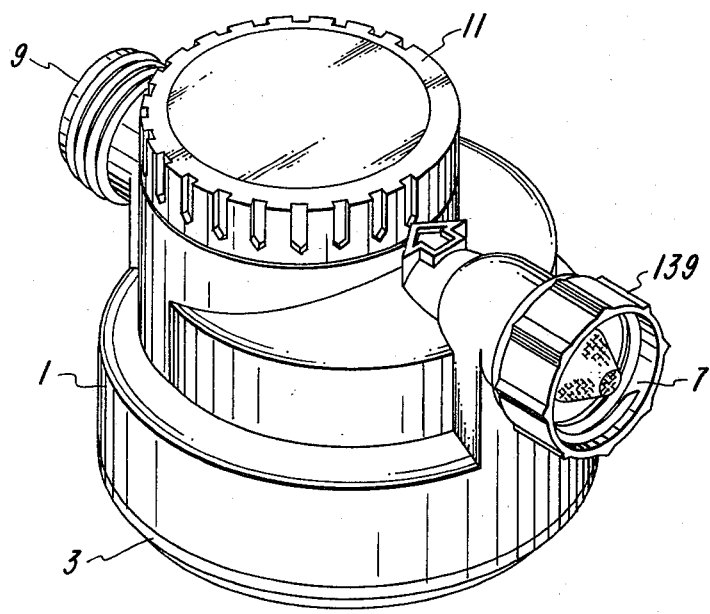
Fig_1
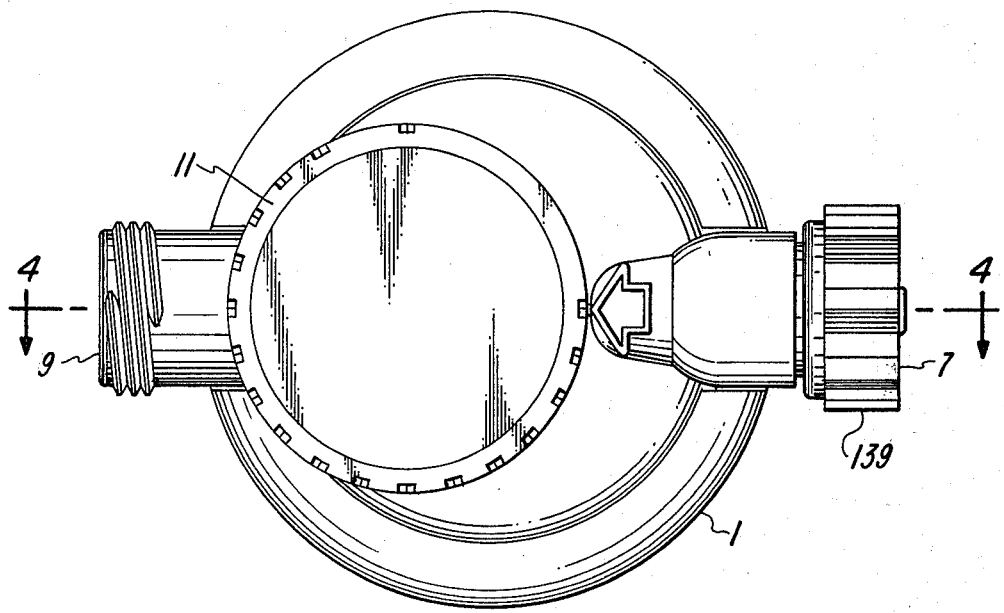
Fig_2

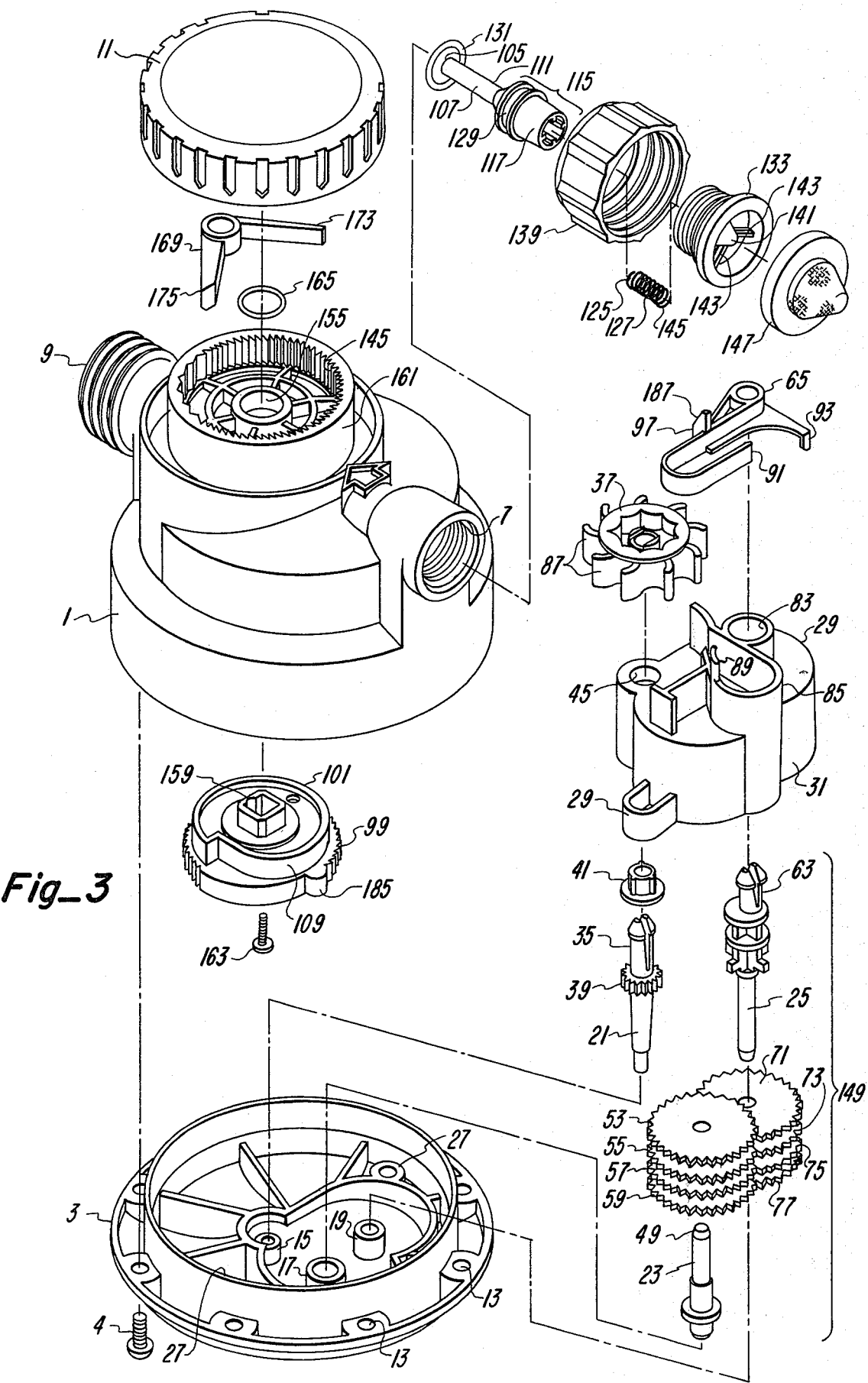
Fig_3

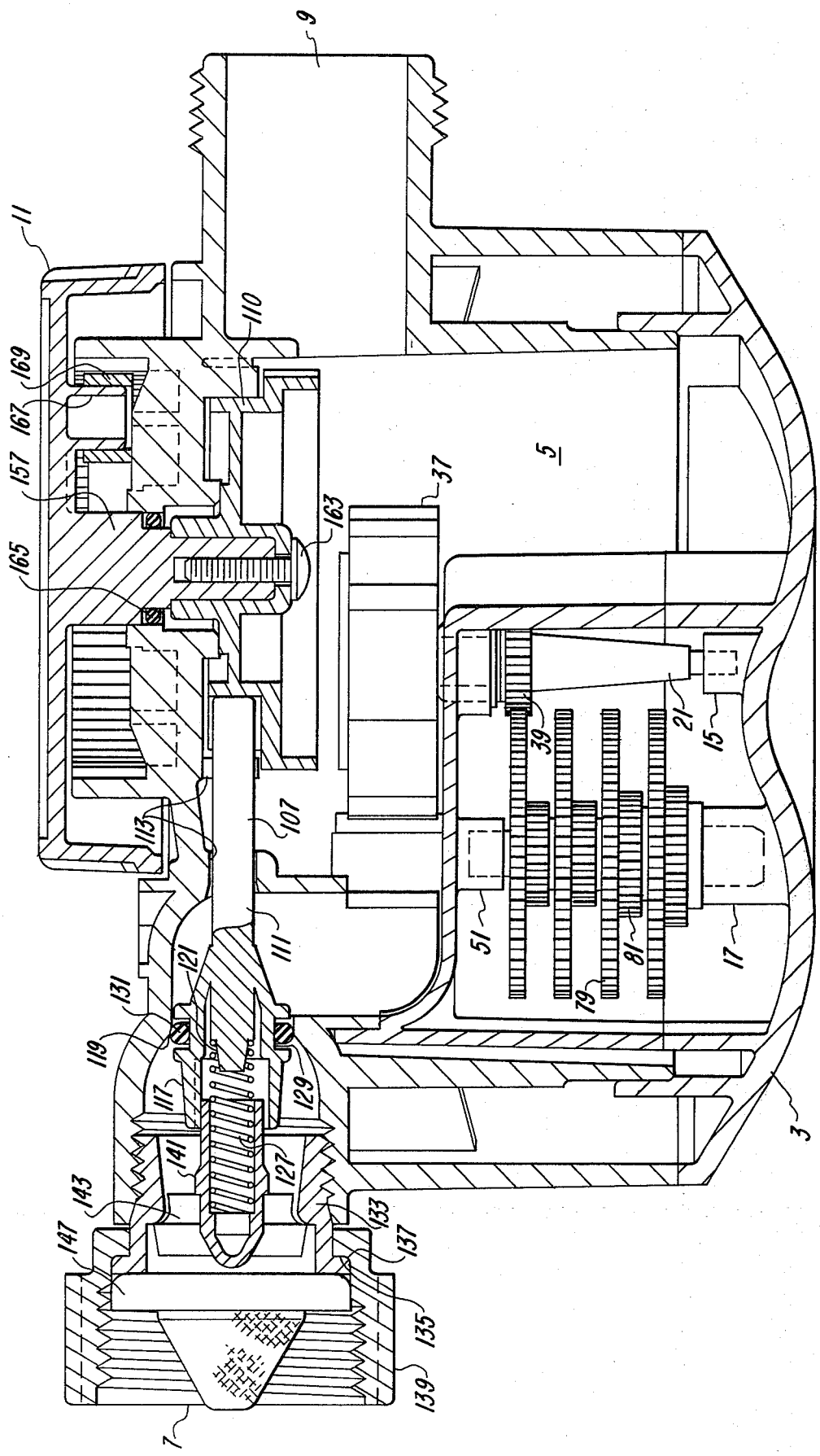
Fig_4

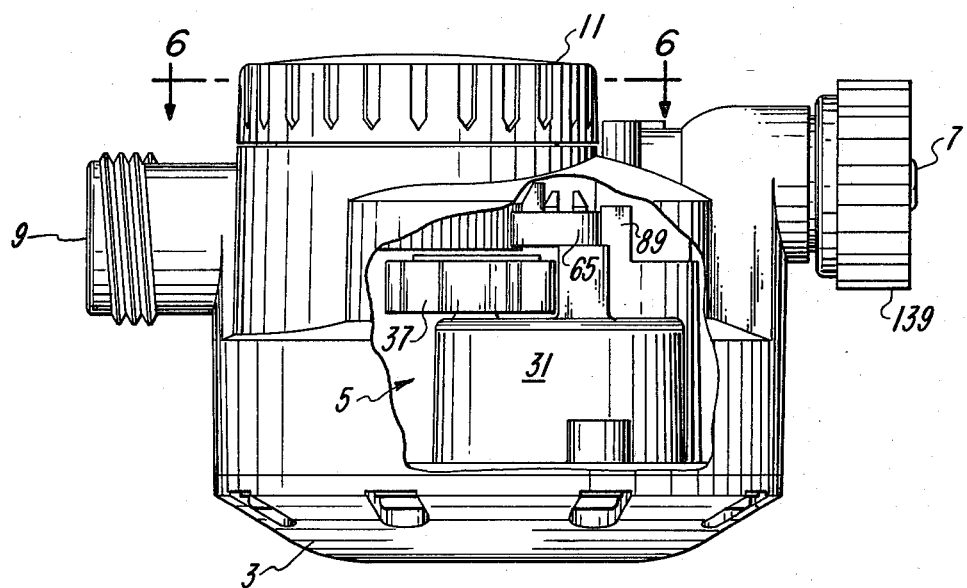
Fig_5
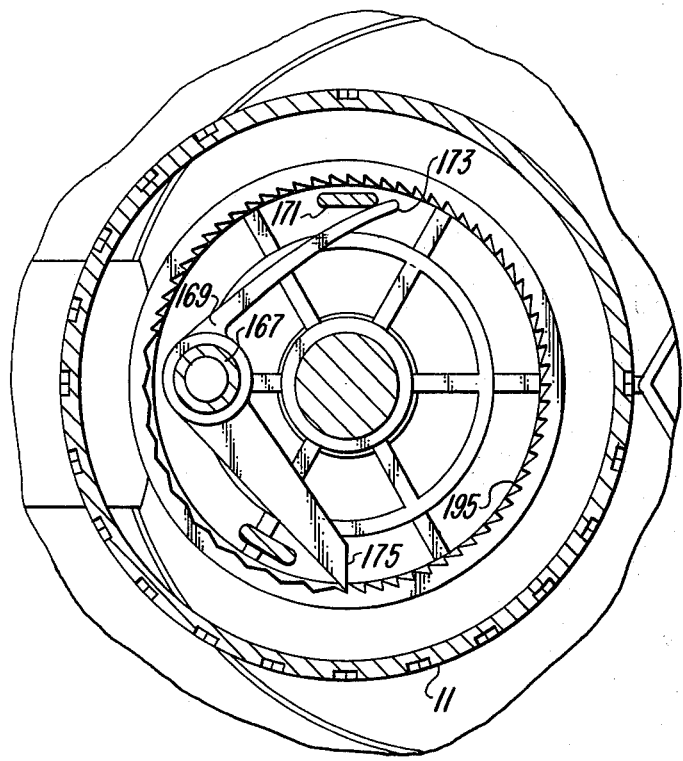
Fig_6

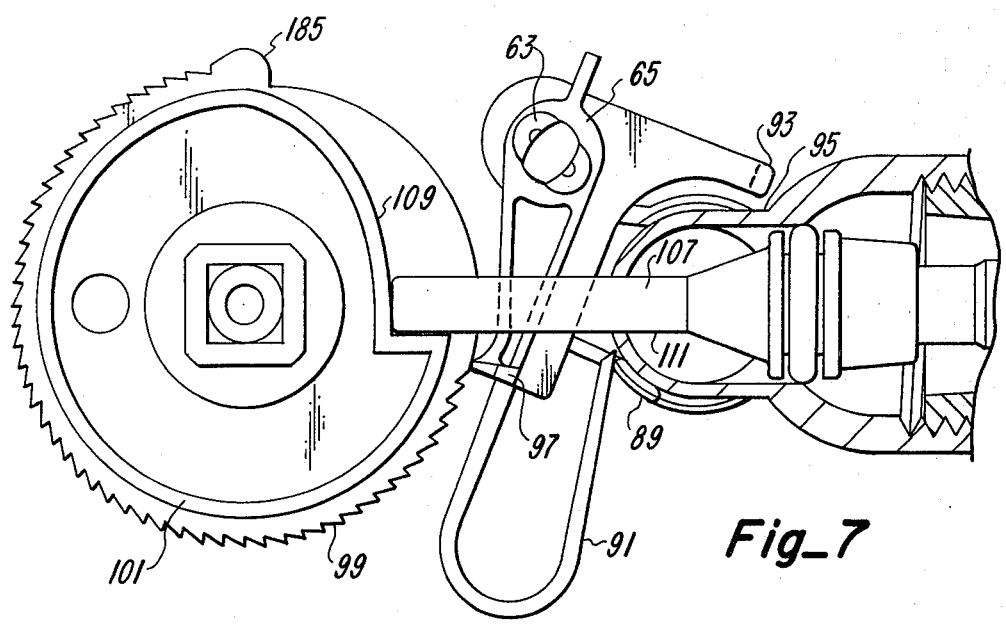
Fig_7
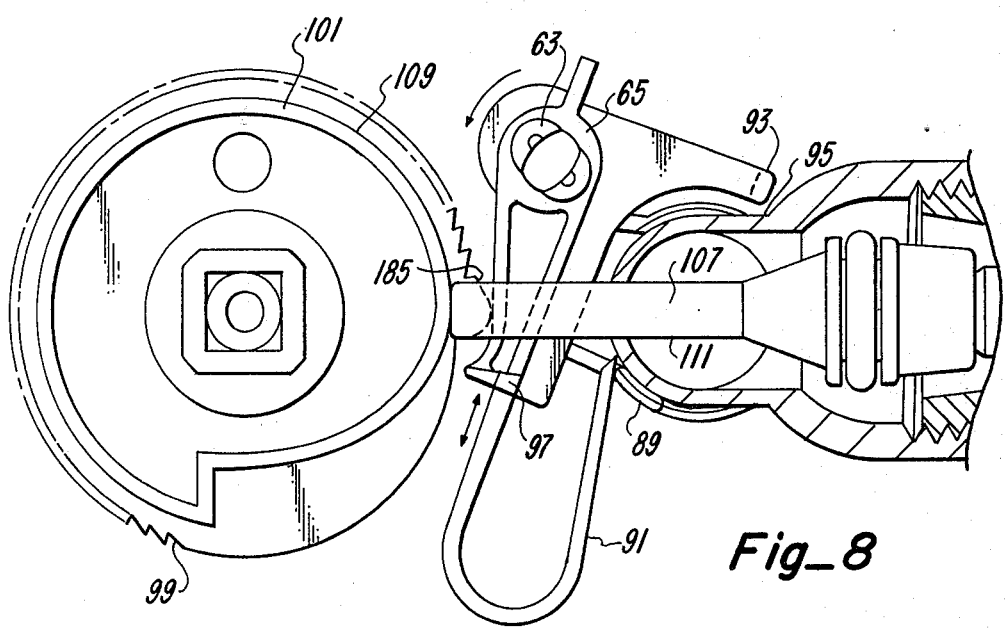
Fig_8

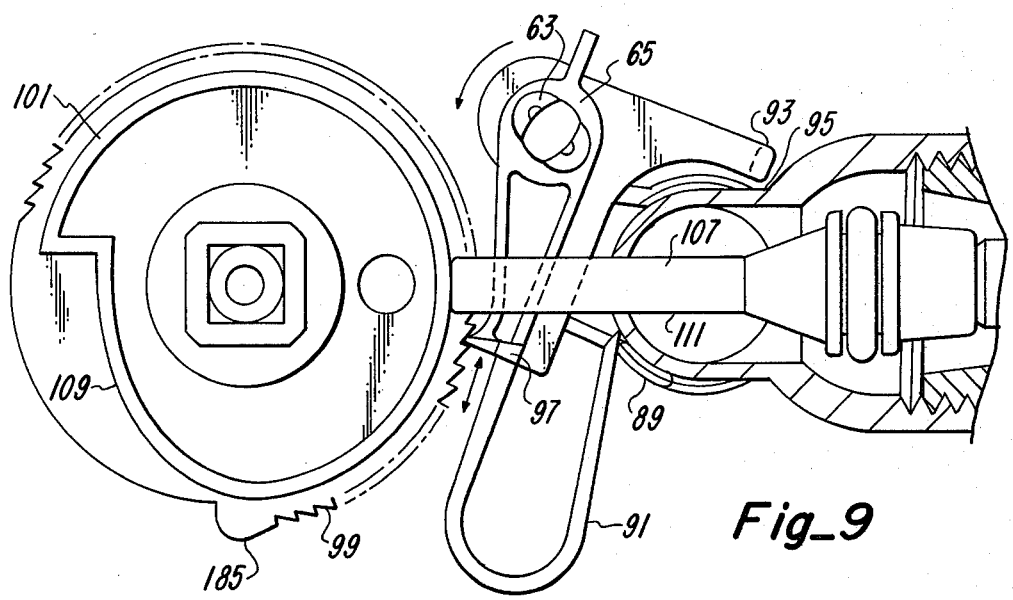
Fig_9
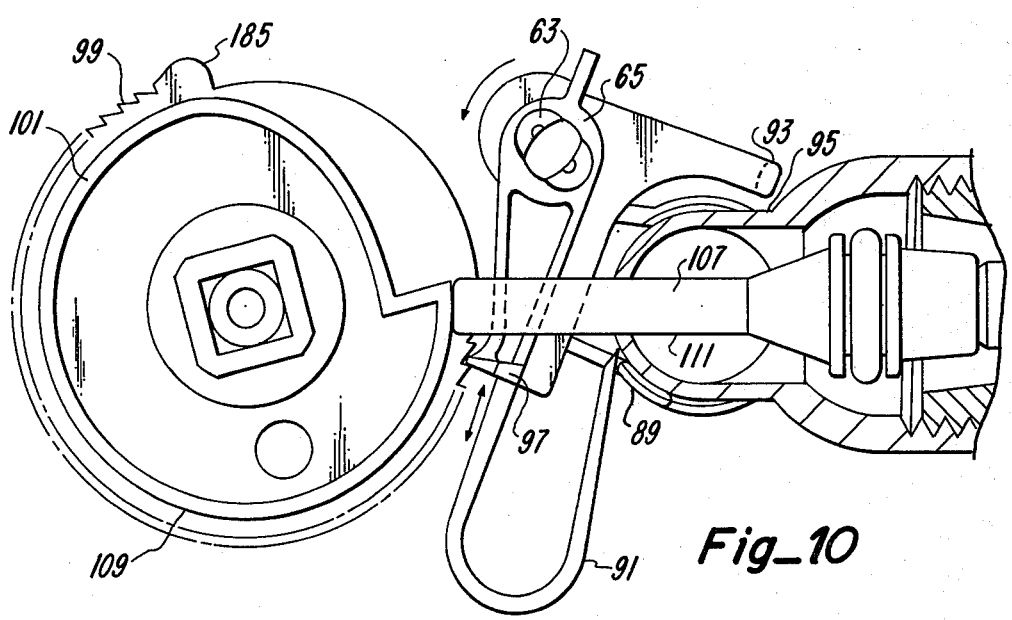
Fig_10

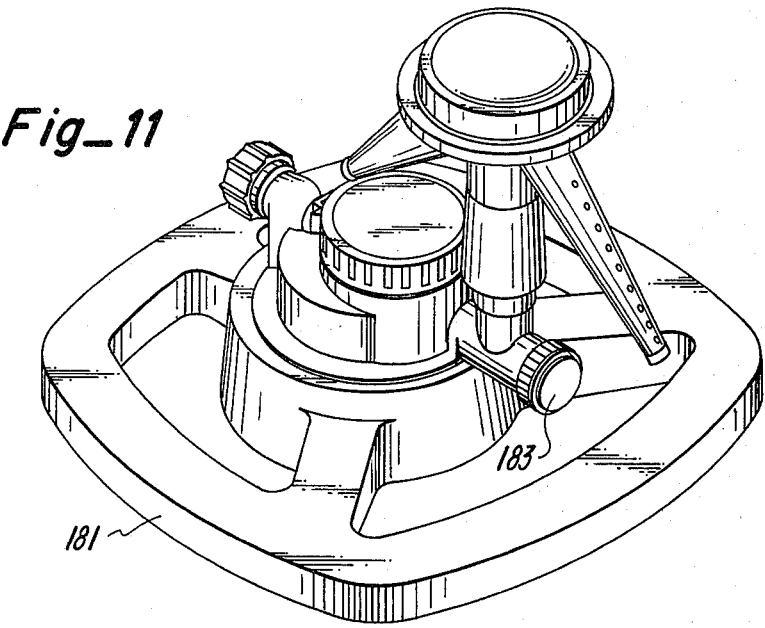
Fig_11
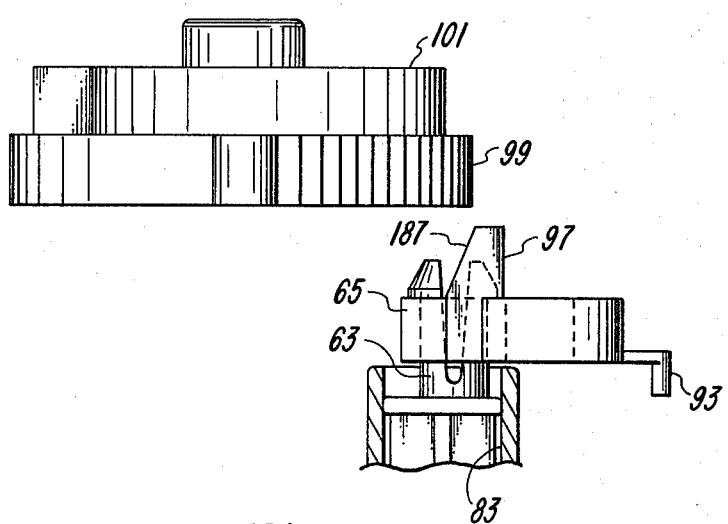
Fig_12

DEVICE FOR CONTROLLING THE FLOW OF FLUID

BACKGROUND OF THE INVENTION

The present invention relates to a device for controlling the flow of fluid, and more particularly to an automatic device which measures the flow of a fluid, such as water, and by the passage of a pre-selected quantity of fluid, a valve is actuated to block further passage of the fluid. This also relates to the combination of such a device and a sprinkler device. A typical use of this device would be to connect its inlet to a source of water under pressure by using a garden hose or the like, and to connect its outlet to a sprinkler device through another such hose, and/or by directly affixing the sprinkler to the device.

Reaction type traveling sprinklers typically use the rotation of the sprinkler head to drive, through a gear train, the wheels of the sprinkler, thereby moving the sprinkler along the ground to engage a stop which has been placed on the ground. The stop bears against a lever on the sprinkler which disengages a valve in the sprinkler from its open position, permitting water pressure or a spring bias to close the valve. Examples of this type of device would be U.S. Pat. Nos. 2,788,241 and 3,377,027.

A piston-driven closure operates by diverting a small portion of the fluid flow, which is being controlled, into a chamber located behind a piston. The build up of water pressure behind the piston causes the piston to move in such a way as to actuated a valve after a predetermined fluid flow. Examples of such a device would be those shown in U.S. Pat. Nos. 3,891,148, 3,964,685, or 3,972,344.

Another type of automatic device typically uses an impeller driven by the fluid flow which is being controlled, which impeller, operating through a gear train, activates a valve. Examples of such devices are those shown in U.S. Pat. Nos. 4,022,239, 1,812,586, 1,523,608, 1,523,609, and 2,781,050.

Various problems and difficulties have been and still are being encountered in providing suitable means for regulating the timing and volume of water required to irrigate land properly. Some specific problems include damage to the device through abuse, and having to disconnect the device if manual operation is desired.

Applicant's invention permits the avoidance of these problems.

SUMMARY OF THE INVENTION

The invention uses an impeller driven by the fluid flow to drive a gear reduction train, the output of said train being used to drive a pawl, which in turn engages the ratchet portion of a generally circular cam and ratchet wheel, thereby causing the cam and ratchet wheel to rotate about its central axis. The cam is contoured to permit its engagement with the stem of a valve in both the open and closed positions of the valve. When the valve is in its open position, the controlled fluid passes around the valve, and through the fluid passageway. In its closed position, the valve blocks the passageway, thereby stopping the fluid flow. The cam's rotation is accomplished in a step-wise fashion, thereby shutting off the fluid flow suddenly after the preselected volume of fluid has passed.

The ratchet portion of the cam and ratchet wheel extends around only a portion of the periphery of the cam and ratchet wheel. On that portion of the cam and ratchet wheel where ratchet teeth are not present, the pawl does not operate to turn the cam and ratchet wheel.

The section of the cam portion of the cam and ratchet wheel, which coincides with the absence of ratchet teeth in the ratchet portion, is contoured in such a fashion as to permit the cam and ratchet wheel to be driven manually against the stem of the valve to move the valve from its closed position to either its fully open position, or to any partially open position desired. In this manner, manual control of the fluid flow may be achieved without the need to disengage the device.

Damage to the device through abuse is avoided by the use of a second pawl and ratchet mechanism, which is located in and under the manually operated control knob. This permits only one way rotation of the control knob. Like the ratchet portion of the cam and ratchet wheel, the ratchet in the control knob extends for only a part of the operative range of the control knob, coinciding with the operative portion of the pawl against the cam and ratchet wheel. Through these various mechanism, the following objectives are sought:

1. A manually operated control knob which is free to move in either direction for a portion of its travel in order to manually adjust the fluid flow without engaging the automatic apparatus.
2. A means to measure fluid flow accurately, and after the passage of a pre-selected volume of fluid, immediately and positively to shut off the further flow of fluid.

BRIEF DESCRIPTION OF THE DRAWING

Embodiments of devices for controlling the flow of fluid according to my invention are shown, by way of example, in the drawings, in which:

FIG. 1 is a perspective view of such a device;

FIG. 2 is a top plan view of the device shown in FIG. 1;

FIG. 3 is an exploded, perspective view showing the components of the device shown in FIG. 1;

FIG. 4 is a central, vertical cross-section taken along the line indicated in FIG. 2;

FIG. 5 is a side elevation of the device shown in FIG. 1 with part of the housing removed;

FIG. 6 is a cross-section taken along the line indicated in FIG. 5;

FIG. 7 shows the relationship of certain parts of the device when the valve is closed;

FIG. 8 shows such relationship in the manual mode of operation, when the valve is fully open;

FIG. 9 shows such relationship in the automatic mode of operation;

FIG. 10 shows such relationship when the device is in the automatic mode of operation, just before it shuts off;

FIG. 11 is a perspective view of a second embodiment wherein the device is incorporated in a sprinkler.

FIG. 12 shows the relationship between the cam and ratchet wheel and the pawl spring just before assembly is completed.

DESCRIPTION OF THE PREFERRED EMBODIMENT

With reference now to the drawings, a device, controlling the flow of fluid is shown generally in FIG. 1, and particularly in FIG. 3, as a housing 1 to which a cover 3 is attached by any suitable means, such as by body screws 4, to form a substantially water-tight chamber 5 having an inlet 7 and an outlet 9. A single knob 11 is provided to operate the device in both its automatic and manual modes.

The cover 3 has holes, generally indicated by 13, through which the body screws 4 may pass to attach the cover 3 to the housing 1. An impeller shaft boss 15, a counter shaft lower boss 17, and an eccentric shaft boss 19 are each formed in the cover 3, into which the lower ends of the impeller shaft 21, the counter shaft 23, and the eccentric shaft 25, respectively, are loosely fit to permit rotation of the shafts. Gear cover bosses 27 are formed in the cover over which the corresponding cover bosses 29 of the gear cover 31 fit snugly to hold the gear cover 31 in place on the cover 3.

The upper end 35 of the impeller shaft 21 is adapted to accept the mounting of the impeller 37 thereon in a fixed relationship to the impeller shaft 21. An impeller pinion 39 is formed intergral with the impeller shaft 21. An impeller shaft bearing 41 is provided at the impeller shaft hole 45 in the gear cover 31 through which the upper end 35 of the impeller shaft 21 passes.

The upper end 49 of the counter shaft 23 is made to fit loosely in the counter shaft upper boss 51 (see FIG. 4) which is formed in the gear cover 31, thereby permitting the counter shaft 23 to rotate freely, however, such free rotation is not necessary for the proper operation of the device. A first gear/pinion 53, second gear/pinion 55, third gear/pinion 57, and fourth gear/pinion 59 are stacked on the counter shaft 23 such that they may each rotate freely about the counter shaft 23.

The upper end 63 of the eccentric shaft 25 is adapted to have the pawl spring 65 mounted thereon. The longitudinal center line of the upper end 63 of the eccentric shaft 25 is offset from and parallel to the longitudinal center line of the eccentric shaft 25 itself. The pawl spring 65 fits loosely on the upper end 63 of the eccentric shaft 25, so that the rotational motion of the eccentric shaft 25 is translated into translational motion of the pawl portion 97 of the pawl spring 65. Fifth gear/pinion 71, sixth gear/pinion 73, seventh gear/pinion 75, and eighth gear 77 are mounted on the eccentric shaft 25 so that each, except the eighth gear 77, are free to rotate about the eccentric shaft 25. The eighth gear 77 is keyed to the eccentric shaft 25 so that rotation of the eighth gear 77 causes equal rotation of eccentric shaft 25.

Each of the first through seventh gear/pinions 53, 55, 57, 59, 71, 73, and 75, have a large diameter common gear portion, shown in FIG. 4 for example by reference numeral 79, and a small diameter pinion portion shown by reference numeral 81. The impeller pinion 39 engages the large diameter common gear portion of the first gear/pinion 53. The small diameter pinion portion of the first gear/pinion 53 engages the large diameter common gear portion of the fifth gear/pinion 71. In like manner, the fifth gear/pinion 71 engages the second gear/pinion 55, which in turn engages the sixth gear/pinion 73, which in turn engages the third gear/pinion 57, which in turn engages the seventh gear/pinion 75, which in turn engages the fourth gear/pinion 59, which in turn engages the eighth gear 77, which is keyed to the eccentric shaft 25. Any suitable combination of numbers of gears and teeth on each gear is a selected to result in any desired relationship between the rotation of the impeller 37, which is measuring the flow of the fluid through the device, and the rotation of the eccentric shaft 25. The upper end 63 of the eccentric shaft 25 passes through an eccentric shaft hole 83 that is formed in the gear cover 31.

A deflection wall 85 is formed in the gear cover 31 to direct the fluid flow into the vanes 87 of impeller 37. The deflection wall 85 is contoured smoothly to minimize turbulence during this change of direction of the fluid flow.

A pawl spring tab 89, seen most clearly in FIG. 8, is formed in the gear cover 31 as an extension of the deflection wall 85, which is a bearing surface for the spring portion 91 of the pawl spring 65, and in conjunction with the pawl spring foot's 93 bearing against the opposite side of the deflection wall 85 at the point indicated by reference numeral 95, positions the pawl portion 97 of the pawl spring 65 properly to engage the ratchet portion 99 of the cam and ratchet wheel 101 during assembly of the device. The impeller 37 is fixed to the upper end 35 of the impeller shaft 21 such that rotation of the impeller 37 causes equal rotation of the impeller shaft 21.

The pawl spring 65 has a pawl spring foot 93 which, prior to completion of assembly of the device, bears against the deflection wall 85 as described above. The pawl portion 97 of the pawl spring 65 engages the ratchet portion 99 of the cam and ratchet wheel 101. The spring portion 91 of the pawl spring 65, by bearing against the deflection wall 85, urges the pawl portion 97 of the pawl spring 65 against the teeth of the ratchet portion 99 of the cam and ratchet wheel 101.

The end of pawl 97 contains an incline 187, which is best seen in FIGS. 12 and 3. During assembly, the pawl spring foot 93 and spring portion 91 bear against the deflection wall 85 and pawl spring tab 89, thereby positioning the pawl 97 to be slightly beneath the cam and ratchet wheel 101, as best seen in FIG. 12. When the housing 1, and hence the cam and ratchet wheel 101, are lowered over the spring pawl 65 and other assembled components, the cam and ratchet wheel 101 engages the incline 187, moving the pawl 97 to the periphery of the cam and ratchet wheel 101, where the pawl 97 properly engages the ratchet teeth of the ratchet portion 99.

The foot 105 of the valve stem 107 is adapted to engage the cam portion 109 of the cam and ratchet wheel 101. The central area of the valve stem 107, shown generally by reference numeral 111, is sufficiently uniform in cross section to permit smooth motion through the valve stem guides 113 formed in the housing 1, as best seen in FIG. 4. The upper end 115 of the valve stem 107 is formed into a circular cup shaped member 117 having a slightly smaller outside diameter than the diameter of the throat 119 of the inlet 7 which is formed in the housing 1, which throat 119 is also circular. The cup shaped member 117 has inside of it a stud 121. The stem end 125 of the valve stem spring 127 is captured between the stud 121 and the cup shaped member 117.

The cup shaped member 117 has a grove 129 formed in its exterior periphery into which an elastic O-ring 131 fits snuggly such that the outside diameter of the O-ring 131 is slightly larger than the diameter of the throat 119 and such that when the valve stem 107 is in a closed position, the throat 119 is completely sealed against fluid flow.

The hose nut ferrule 133 has a shoulder 135 which is large enough to trap the shoulder 137 of the coupling nut 139 between the hose nut ferrule 133 and the body of the inlet 7, thereby permitting the coupling nut 139 to rotate freely. The hose nut ferrule is threaded externally to screw into complimentary internal threads of the inlet 7 of the housing 1, thereby trapping the hose coupling 139 as described. The ferrule cup portion 141 of the hose nut ferrule 133 is supported along the longitudinal access of the hose nut ferrule 133 by three ribs 143 of the hose nut ferrule 133. The ferrule end 145 of the valve stem spring 127 is captured in the ferrule cup 141, thereby urging the valve stem 107 against the cam surface 109 of the cam and ratchet wheel 101.

The coupling nut 139 is adapted to accept connection to a hose as a supply of water under pressure. The filter washer 147 is pressed into place, being of such dimension and elasticity to assure a snug fit.

In the chamber 5 is contained a gear train (generally consisting of the impeller shaft 21, the counter shaft 23, eccentric shaft 25, and the first gear/pinion 53, second gear/pinion 55, third gear/pinion 57, fourth gear/pinion 59, fifth gear/pinion 71, sixth gear/pinion 73, seventh gear/pinion 75, and eighth gear 77), which gear train is denoted generally by the numeral 149, the impeller 37, the pawl spring 65, the gear cover 31, and the cam and ratchet wheel 101. The inlet 7 and outlet 9 are formed in the housing 1, the outlet 9 being adapted to connect with a hose or sprinkler. The inlet 7 is tapered to form the throat 119, which is engaged by the O-ring 131 of the valve stem 107 when in the closed position. The fluid passageway inside the of the housing 1 beyond the throat 119 is contoured to deflect the fluid flow to the top of the gear cover 31 and against the deflector wall 85, which in turn deflects the fluid flow into the vanes 87 of the impeller 37, after which the fluid flow passes to the outlet 9. A hole 155 is formed in the top of the housing 1 through which the stem 157 of the knob 11 passes.

Turning to the outside of the housing 1, a large circular boss 161, of smaller diameter than the knob 11 is formed in the housing 1. A knob stopper ratchet 195 (see FIG. 6) is formed around the inside surface of the large circular boss 161, having ratchet teeth which extend around about three-fourths of the circumference of the large circular boss 161, and non-ratchet teeth detents around the balance of the circumference (although this could be left smooth), all corresponding to the ratchet portion 99 of the cam and ratchet wheel.

The knob 11 is generally circular shaped and large enough to be conveniently handled manually. It contains markings to indicate various stages of the automatic mode of operation as well as the manual mode of operation. The stem 157 passes through the hole 155, and on the opposite side of the housing 1, is keyed to match the key 159 of the cam and ratchet wheel 101 and is fixed thereto by suitable means, such as a screw 163. A suitable gasket or O-ring 165 is provided to seal the hole 155 around the stem 157. A pivot boss 167 is provided on which the knob stopper 169 is mounted, as best seen in FIG. 6. A stop boss 171 is provided against which the spring portion 173 of the knob stopper bears. The pawl end 175 of the knob stopper 169 engages the ratchet teeth of the knob stopper ratchet 195 to permit rotation of the knob 11 in only one direction so long as the pawl end 175 engages said ratchet teeth.

The cam and ratchet wheel 101 is a generally circular shape. The cam portion 109 has an increasing radius over about one-fourth of the circumference thereof, and has a fairly constant radius about the balance of the circumference. As seen best in FIG. 4, when the valve stem 107 is in the closed position, the cam portion 109 bears against the inside of the housing 1 at a point opposite where the foot 105 of the valve stem 107 engages the cam portion 109, generally indicated by reference numeral 110. This arrangement supports the stem 157 against stress caused by water pressure on the valve stem 107 being transmitted to the stem 157. The ratchet portion 99 has ratchet teeth about the outer circumference thereof, corresponding generally to that part of the cam portion 109 which has a constant radius. The ratchet portion 99 has no ratchet teeth on the circumference corresponding to that area of the cam portion 109 which has an increasing radius.

The pawl 97 bears against the ratchet teeth of the cam and ratchet wheel 101, thereby driving the cam and ratchet wheel 101, while the valve stem 107 bears against that part of the cam portion 109 which has a constant radius (which would correspond to a fully opened valve). The pawl 97 bears against the toothless part of the ratchet portion 109 while the valve stem 107 bears against that part of the cam portion 109 which has an increasing radius, thereby permitting manual regulation of the rate of fluid flow without engagement of the automtic mechanism. Part of the constant radius part of the cam portion 109 also corresponds to some of the toothless portion of the ratchet portion 99, to permit full rate of fluid flow during the manual operating mode.

The knob stopper 169 is so positioned within the knob 11 as to permit engagement of the pawl end 175 with the ratchet teeth of the large circular boss 161 only when the device is in the automatic mode (i.e., when the pawl 97 is engaging ratchet teeth of the ratchet portion 99). This prevents rotation of the cam and ratchet wheel 101 against the pawl 97, in order to prevent damage to the internal mechanism of the device. The pawl end 175 bears against the non ratchet tooth portion of the large circular boss 161 during the manual operating mode (i.e., when the pawl 97 does not bear against ratchet teeth). This corresponds to the valve stem 107 bearing against that part of the cam portion 109 which has an increasing radius, (i.e. manual operation).

The outlet 9 can be adapted to accept sprinkler heads directly as shown in FIG. 11, and a base 181 can be attached to, or be made integral with, the cover 3 to support the combination of the sprinkler and the device together.

In operation, a source of fluid, such as water, under pressure is attached, preferably through flexible hose, to the inlet 7 of the device, and a sprinkling device is attached directly, or through a hose, to the outlet 9 of the device. Alternatively, a sprinkler is mounted directly on one orifice of the outlet, as shown in FIG. 11, and the second orifice of the outlet 9 is stopped with a cap 183, or is connected in parallel to another sprinkler.

In the automatic mode, as shown in FIG. 9, the knob is turned clockwise to a position indicating the volume of water desired before automatic shutoff. This rotates the cam and ratchet wheel 101, which forces the valve stem 107 against the valve stem spring 127, and thereby opens the passageway at the throat 119 to permit water to flow through the device. The water flow is deflected across the vanes 87 of the impeller 37, causing the impeller 37 and the impeller shaft 21, to rotate. The impeller shaft 21, being the input to the gear train 149, causes the eccentric shaft 25 to rotate. As the eccentric shaft 25 rotates, a reciprocating transverse motion is imparted to the pawl 97. This in turn engages the ratchet portion 99, causing the cam and ratchet wheel 101 to rotate until the preselected volume of water has passed the impeller. At this point, the cam and ratchet wheel 101 moves from the position shown in FIG. 10 to the position shown in FIG. 7, wherein the valve stem 107 bearing against the cam portion 109 moves to the closed position, sealing the throat 119 against further flow.

Without having to remove the device, a manual mode of operation can be used, simply by rotating the knob 11 only during the first 90 degrees or so of operation, to the extent necessary to adjust the rate of flow to that which is desired.

During the manual operation of the device, as shown in FIG. 8, the pawl 97 will continue to reciprocate. A nub 185 is formed in the cam and ratchet wheel 101, which lifts the end of the pawl 97 off of the cam portion 109, as shown in FIG. 8, to avoid unnecessary wear of the end of pawl 97. This occurs generally in the high fluid flow area of manual operation, which would be expected to produce the fastest rate of wear otherwise.

While there has been illustrated and described a preferred embodiment of the present invention, it will be understood that numerous changes or modifications will occur to those skilled in the art which still would embody the present invention. It is intended in the appended claims to cover all such changes and modifications as fall within the true spirit and scope of the present invention.

I claim:

1. A device for controlling the flow of fluid, comprising:
   (A) a housing, the walls of which define a chamber, said housing having a fluid flow inlet and a fluid flow outlet;
   (B) means rotatably mounted to and at least partially within said chamber for measuring the volume of said flow through said chamber;
   (C) a pawl movably mounted within said chamber actuated by said measuring means;
   (D) a cam and ratchet wheel secured to said housing and rotatably disposed within said chamber adjacent said pawl for being driven by said pawl;
   (E) a valve for controlling said flow through said chamber from said inlet to said outlet in response to the rotational disposition of said cam and ratchet wheel; and
   (F) a means for manually rotating said cam and ratchet wheel.

2. A device for controlling the flow of fluid as recited in claim 1, wherein said cam and ratchet wheel has a cam portion engaged by said valve and a ratchet portion corresponding to said cam portion configured and dimensioned to be driven by said pawl.

3. A device for controlling the flow of fluid as recited in claim 2, wherein the contour of said cam portion has a first cam section corresponding to the closed position of said valve, and a second cam section corresponding to the open position of said valve.

4. A device for controlling the flow of fluid as recited in claim 3, wherein the contour of said cam portion has a third cam section between said first cam section and said second cam section, which third cam section provides a gradual transition from said first cam section to said second cam section.

5. A device for controlling the flow of fluid as recited in claim 4, wherein said ratchet portion has a first ratchet section which has no ratchet teeth, which first ratchet section corresponds to said third cam section.

6. A device for controlling the flow of fluid as recited in claim 5, wherein said third cam section is about one-fourth of said contour.

7. A device for controlling the flow of fluid as recited in claim 1, 2, 3, 4, 5, or 6, further comprising:
   a sprinkler head mounted in said outlet.

8. A device for controlling the flow of fluid as recited in claim 1, 2, 3, 4, 5, or 6, wherein said outlet is adapted to permit the mounting of a sprinkler head thereon.

9. A device for controlling the flow of fluid as recited in claim 1, 2, 3, 4, 5, or 6, wherein said outlet has a first orifice and a second orifice, said first orifice being adapted to permit the mounting of a sprinkler head thereon.

10. A device for controlling the flow of fluid as recited in claim 1, 2, 3, 4, 5, or 6, wherein said outlet has a first orifice and a second orifice, and further comprising:
    a sprinkler head mounted in said first orifice, said device controlling the flow of fluid to said sprinkler head but not otherwise affecting operation of said sprinkler head.

11. A device for controlling the flow of fluid as recited in claim 1, 2, 3, 4, 5, or 6, further comprising:
    means for preventing rotation of said cam and ratchet wheel.

12. A device for controlling the flow of fluid as recited in claim 1, 2, 3, 4, 5, or 6, wherein said cam and ratchet wheel has a nub.

13. A device for controlling the flow of fluid as recited in claim 1, 2, 3, 4, 5, or 6, further comprising:
    a gear reduction train, having an input shaft and an eccentric output shaft; and
    wherein said measuring means is an impeller fixed to said input shaft; and
    wherein said pawl is rotatably mounted on said output shaft.

14. A device for controlling the flow of fluid as recited in claim 1, 2, 3, 4, 5, or 6, wherein said pawl has an inclined edge for assisting engagement with said cam and ratchet wheel.

15. A device for controlling the flow of fluid as recited in claim 1, 2, 3, 4, 5, or 6, wherein said pawl is integrally formed with a spring.

16. A device for controlling the flow of fluid as recited in claim 1, 2, 3, 4, 5, or 6, further comprising:
    a knob stopper ratchet; and
    a knob stopper pawl affixed to said rotating means, said knob stopper pawl engaging said knob stopper ratchet to limit rotation of said rotating means to a given direction over a portion of its arc of rotation.

17. A device for controlling the flow of fluid as recited in claim 16, wherein said knob stopper pawl is integrally formed with a spring, and said housing includes a knob stop, said spring being adapted to abut said knob stop and thereby limit rotation of said knob stopper pawl.

* * * * *

REEXAMINATION CERTIFICATE (822nd)
United States Patent [19]
Chow

[11] B1 4,335,852
[45] Certificate Issued Mar. 22, 1988

[54] DEVICE FOR CONTROLLING THE FLOW OF FLUID

[75] Inventor: Ho Chow, River Edge, N.J.

[73] Assignee: Jet Stream, Inc., Wilmington, Del.

Reexamination Request:
No. 90/001,310, Aug. 21, 1987

Reexamination Certificate for:
Patent No.: 4,335,852
Issued: Jun. 22, 1982
Appl. No.: 145,798
Filed: May 1, 1980

[51] Int. Cl.⁴ .............................................. A01G 27/00
[52] U.S. Cl. ................................ 239/68; 137/624.12; 239/570

[56] References Cited
U.S. PATENT DOCUMENTS
3,567,122  3/1971  Congdon .............................. 239/69

*Primary Examiner*—Andres Kashnikow

[57] ABSTRACT

A device to control the flow of fluid uses a cam and ratchet wheel. A valve is operated by the cam portion of the wheel, which bears against the valve stem causing it to open. Fluid flow causes a pawl to drive the ratchet portion of the wheel, rotating the wheel until the valve stem bears against a low point in the cam, permitting the valve to close. A part of the ratchet portion does not contain ratchet teeth, in which area the pawl cannot drive the wheel. In this area, the cam has an increasing radius from a radius corresponding to a closed valve, to a radius corresponding to a fully open valve. This permits manual control of fluid flow without disengagement of the device.

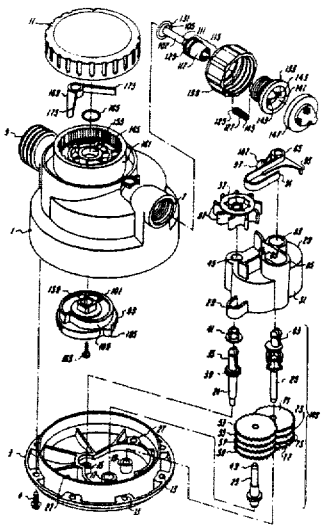

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-17 is confirmed.

* * * * *